United States Patent
Pande et al.

(10) Patent No.: US 10,050,878 B2
(45) Date of Patent: Aug. 14, 2018

(54) NETWORK COMMUNICATION SYSTEM WITH NODE ENERGY REDUCTION PACKET PROTOCOL

(71) Applicant: Texas Instruments Incorporated, Dallas, TX (US)

(72) Inventors: Tarkesh Pande, Richardson, TX (US); Srinivas Lingam, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 59 days.

(21) Appl. No.: 14/953,683

(22) Filed: Nov. 30, 2015

(65) Prior Publication Data

US 2016/0330116 A1 Nov. 10, 2016

Related U.S. Application Data

(60) Provisional application No. 62/158,307, filed on May 7, 2015.

(51) Int. Cl.
*H04J 3/00* (2006.01)
*H04L 12/721* (2013.01)
*H04L 12/26* (2006.01)
*H04L 12/741* (2013.01)
*H04L 12/833* (2013.01)

(52) U.S. Cl.
CPC ............ *H04L 45/70* (2013.01); *H04L 43/08* (2013.01); *H04L 45/74* (2013.01); *H04L 47/2458* (2013.01); *H04L 43/16* (2013.01)

(58) Field of Classification Search
CPC combination set(s) only.
See application file for complete search history.

(56) References Cited

U.S. PATENT DOCUMENTS

| | | | |
|---|---|---|---|
| 8,320,233 B2* | 11/2012 | Razazian | H04B 3/54 370/208 |
| 8,837,268 B2* | 9/2014 | Verbin | H04B 3/542 370/201 |
| 9,184,967 B1* | 11/2015 | Ibrahim | H04L 7/042 |
| 9,276,636 B2 | 3/2016 | Lingam et al. | |
| 9,282,525 B2* | 3/2016 | Zeng | H04W 56/0005 |

(Continued)

OTHER PUBLICATIONS

IEEE Std 1901.2, IEEE Standard for Low-Frequency (less than 500 kHz) Narrowband Power Line Communications for Smart Grid Application, IEEE, 269 pages, 2013.*

(Continued)

*Primary Examiner* — Frank Duong
(74) *Attorney, Agent, or Firm* — Kenneth Liu; Charles A. Brill; Frank D. Cimino

(57) ABSTRACT

A method of communicating a packet between a first node and a second node, the packet comprising a data payload and a portion of information preceding the data payload. The method comprises: (i) first, identifying a quality of a channel between the first node and the second node; (ii) second, in response to the quality of the channel, selecting a manner of communication of the information preceding the data payload; (iii) third, encoding the selected manner of communication in the portion of information preceding data payload; and (iv) fourth, transmitting the packet from the first node to the second node.

14 Claims, 3 Drawing Sheets

(56) References Cited

U.S. PATENT DOCUMENTS

2012/0093198 A1* 4/2012 Dabak .................... H04B 3/542
                                                                375/139
2012/0320996 A1* 12/2012 Dabak ..................... H04B 3/54
                                                                375/257
2015/0365224 A1* 12/2015 Waheed ................. H04B 3/542
                                                                370/509

OTHER PUBLICATIONS

ITU-T G.9903, Series G: Transmission Systems and Media, Digital Systems and Networks Access networks—In premises networks Amendment, Narrow-band orthogonal frequency division multiplexing power line communication transceivers for G3-PLC networks Amendment 1, 361 pages, May 2013.*

* cited by examiner

US 10,050,878 B2

NETWORK COMMUNICATION SYSTEM WITH NODE ENERGY REDUCTION PACKET PROTOCOL

CROSS-REFERENCES TO RELATED APPLICATIONS

This application claims priority to, the benefit of the filing date of, and hereby incorporates herein by reference, U.S. Provisional Patent Application 62/158,307, entitled "METHODS TO MINIMIZE ENERGY CONSUMPTION IN COMMUNICATION SYSTEMS," and filed May 7, 2015.

STATEMENT REGARDING FEDERALLY SPONSORED RESEARCH OR DEVELOPMENT

Not Applicable.

BACKGROUND OF THE INVENTION

The preferred embodiments relate to network communication systems and more particularly to energy reduction in system nodes.

Various wireless and wireline networks have different nodes that communicate with one another via a network, including example networks such as point-to-point networks and mesh networks. In either example, one node in a network communicates with another node. For the point-to-point descriptor, however, generally a first node communicates directly with a second node, where the second node is the final intended recipient of the communication. For the mesh descriptor, however, a first node may communicate to a second node, which is along the way of one or many nodes that pass along a communication to ultimately reach a destination node that is the final intended recipient of the communication; such passing along is sometimes referred to as hopping and the network a multi-hop network. In any event, such communications are in contrast to multipoint (or broadcast), where a transmitting node communicates simultaneously to multiple different nodes.

Network nodes are now being implemented in numerous forms of sensors/controllers that typically communicate data about some related apparatus and my provide control to that apparatus. For example, narrow band power line communication (PLC) is a low data rate (5 kb/s to 1024 kb/s), communication technology that is specifically designed to be used in smart utility metering applications, automated meter reading, renewable energy communications, lighting control, and communication between electric vehicle and electric vehicle service equipment, among other applications. As another example, IEEE 802.15.4g pertains to the communications technology used in Smart Utility Networks (SUN) for wireless media, and this acts as a complement to the wired NB-PLC technology for Smart Grid communications. As still another example, the Internet Of Things is a developing technology where communication nodes look to be implemented into myriad different applications for purposes of data gathering and device control. Certain of the nodes in these and other applications are, or will be, powered by small batteries and, as such, an ongoing goal is to minimize power consumption so as to sustain the operation of the node as long as possible without requiring the battery to be changed. Thus, various efforts are made in the industry, including in hardware, software, and the like, toward the goal of power efficiency. The preferred embodiments also endeavor to improve the prior art in this regard, as are further detailed below.

BRIEF SUMMARY OF THE INVENTION

In a preferred embodiment, there is a method of communicating a packet between a first node and a second node, the packet comprising a data payload and a portion of information preceding the data payload. The method comprises: (i) first, identifying a quality of a channel between the first node and the second node; (ii) second, in response to the quality of the channel, selecting a manner of communication of the information preceding the data payload; (iii) third, encoding the selected manner of communication in the portion of information preceding the data payload; and (iv) fourth, transmitting the packet from the first node to the second node.

Numerous other inventive aspects and preferred embodiments are also disclosed and claimed.

DETAILED DESCRIPTION OF EMBODIMENTS

Figure 1:
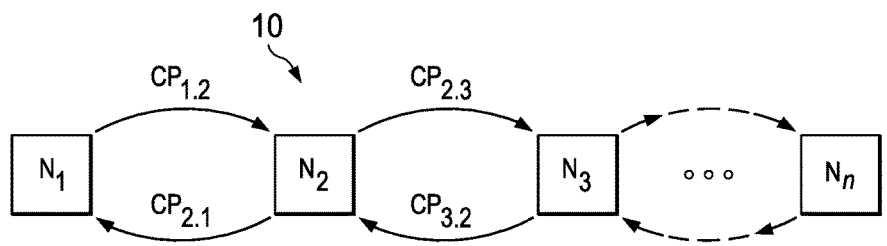
FIG. 1 illustrates a block diagram of network nodes as part of a communications system.

FIG. 1 illustrates a block diagram of network nodes $N_1$ and $N_2$ as part of a network communications system 10, which is known in the art and is further improved upon per the preferred embodiments. Each of the nodes $N_x$ in system 10 may represent various devices, and will be understood to include sufficient hardware and/or software to perform the communication functionality described in this document, where such hardware and software are readily ascertainable by one skilled in the art. For example, each of the nodes $N_x$ in system 10 typically includes a communication interface (e.g., RF transceiver; analog/digital front end), processing circuitry, memory or hardcoded programming space, and input/output functionality. In addition, each of the nodes $N_x$ in system 10 may include additional functionality, such as in connection with data sensing/gathering and device control, typically at a location where the node $N_x$ is located. Still further, in some preferred embodiments, each of the nodes $N_x$ is battery operated, so that reducing power consumption so as to increase the time needed between battery changes is critical, based on considerations including cost, access, viability, and the like.

Figure 2:
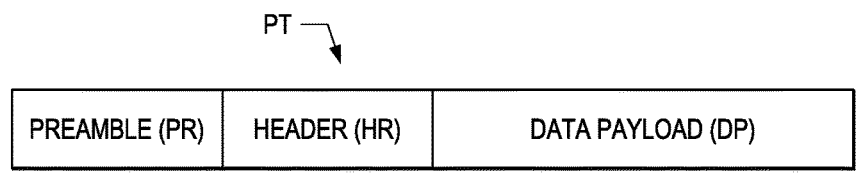
FIG. 2 illustrates a general form of such a packet PT, including a preamble PR, followed by a header HD, followed by a data payload PD.

Nodes $N_1$ and $N_2$ communicate bi-directionally with each other, as shown generally via communication paths $CP_{1,2}$ and $CP_{2,1}$. Communication paths $CP_{1,2}$ and $CP_{2,1}$ may be via a wire (not shown) or wirelessly such as through radio frequency transceivers, and the path traveled by such communications is typically referred to as the channel. Moreover, by various different communication standards or protocols, typically each communication is by way of a set of information typically referred to as a packet, although in some standards or conventions a packet also may be referred to as a frame. For purposes of the preferred embodiment, a general form of such a packet PT is shown in FIG. 2, and it includes a preamble PR, followed by a header HD, followed by a data payload PD. Other information also may be included, but these three aspects suffice for demonstrating the inventive scope. In general, the preamble PR is a type of introduction that indicates the beginning of the packet, whereby another node(s) in system 10 may monitor for and detect the packet presence, and potentially synchronize with it, by having detected its preamble. In general, the header HD precedes the data payload DP and contains other information so that the data payload DP can be properly comprehended by a receiving node, so for example the header HD may indicate how much information will be contained in the data payload DP as well as addressing information so that the packet PT reaches the proper destination node. Finally, the data payload DP includes the actual data (e.g., sensed or collected information; control information) intended by the sending node to reach a destination node, where such information was typically originally analog or digital information that, for efficiency of transmission, has been mapped to some type of constellation by way of a modulation scheme, where such schemes may include, by ways of example, phase shift keying (PSK), such as two point binary (BPSK), four point quadrature (QPSK), or eight point quadrature (8PSK).

FIG. 1 also illustrates a node $N_3$, which likewise may communicate directly with node $N_2$ via communication paths $CP_{2,3}$ and $CP_{3,2}$; moreover, node $N_3$ may communicate with node $N_1$, with node $N_2$ acting as an intermediate node that receives such communications and forwards them, as between nodes $N_1$ and $N_3$. To simplify the illustration, therefore, only three nodes are explicitly shown in FIG. 1, but an additional node $N_n$ is shown to demonstrate, as one skilled in the art will readily understand, that common networks can include a significantly large number of nodes.

In system 10, the preferred embodiments endeavor to improve power consumption by each node in connection with its communications of packets. Such a goal may be understood with respect to the energy required for a successful communication between nodes, where such energy involves the energy required of the transmitting node and the energy required of the receiving node, where the former modulates, encodes and transmits the packet, and the latter receives, detects, partially or fully decodes (depending on whether it is the final destination node), and returns some form of response to the transmitting node, where a minimum such response typically involves some type of acknowledgment to the transmitting node that the packet was received and returns some type of error correcting code. Indeed, the present inventors recognize that for a relatively short data payload DP, then a great deal of the relative power/energy consumption involved in the communication (i.e., transmit, receipt, and acknowledgment) of that packet relates to the packet preamble PR and header HR, that is, for a smaller data payload DP, the packet preamble PR and header HR constitute a total greater percentage of the entirety of information in the packet and, hence, they likewise constitute a total greater percentage of the power/energy consumed in communicating the packet. The preferred embodiments, therefore, seek to reduce such power/energy consumption, as further detailed below.

Figure 3:
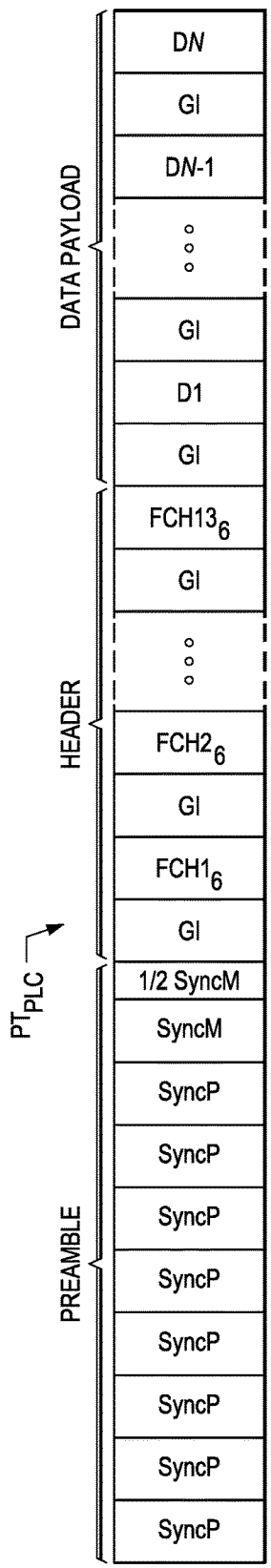
FIG. 3 illustrates an example of a communication packet $PT_{PLC}$ for G3-PLC.

FIG. 3 illustrates an example of a communication packet $PT_{PLC}$ for G3-PLC, an industry standard developed for powerline communications in an electricity grid. The G3-PLC packet $PT_{PLC}$ includes the same general segments of FIG. 2, including therefore a packet preamble PR, a header HR (sometimes referred to as a frame control header, FCH), and a data payload DP. The packet preamble PR includes eight identical SyncP symbols, where each such symbol is a so-called chirp signal, meaning a signal in which the frequency changes (e.g., increases for the SyncP) in time. After the eight SyncP symbols, the packet preamble PR concludes with one and a half SyncM symbols, which SyncM is the negative of SyncP, so that the SyncM is also a chirp signal with a frequency increasing in time, but with a negative amplitude relative to the SyncP symbol. In general, the packet $PT_{PLC}$ preamble PR is used for synchronization and detection and provides a known sequence to facilitate automatic gain control (AGC) adaptation. The $PT_{PLC}$ header HR (or FCH) consists of a number (e.g., 13) of FCH symbols, each comprising both an FCH segment and an FCH cyclic prefix, separated from a preceding FCH symbol by a guard interval (GI). Also in FIG. 3, each FCH segment is shown with a subscript of 6, as a so-called super ROBO coding is involved in encoding what results in the 13 FCH symbols. Particularly, the information encoded in header HR initially consists of a number of bits, where in the example of a CENELEC header for IEEE 1901.2, the number of bits equals 39 bits. These bits pass through a ½ convolutional encoder, which thereby doubles the information to 78 bits. Repetition by 6 coding is then applied to each of these 78 bits, meaning, for each bit, its value of 1 or 0 is repeated 6 times, thereby creating a total of 468 (i.e., 78*6=468) bits; these bits are interleaved and then communicated across a total of 36 frequencies or tones, thereby resulting in 468/36=13 FCH symbols, as shown in FIG. 3. On receipt of the header, therefore, the receiving node $N_x$ reverses the above, so as to eventually decode back to the original 39 bits. Further, the G3-PLC packet header HR contains the control information required to demodulate the data payload. Lastly, the packet $PT_{PLC}$ data payload DP includes any number N of data symbols, also separated by guard intervals (GI).

Figure 4:
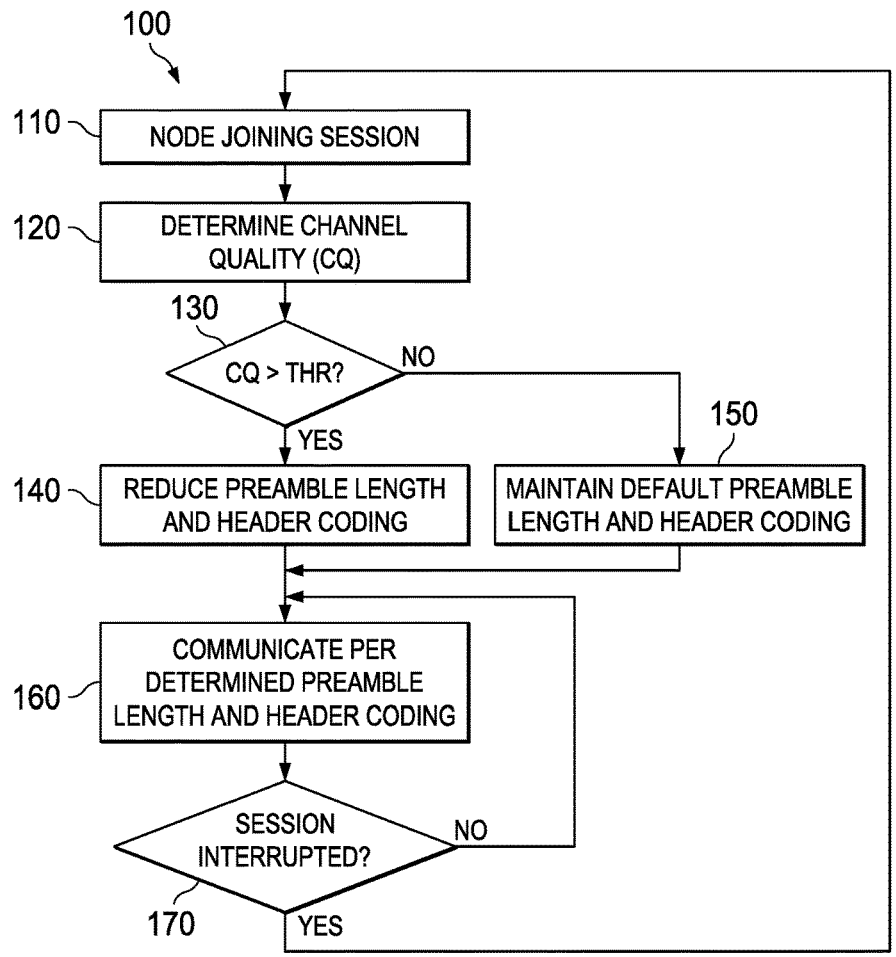
FIG. 4 illustrates a flowchart of a preferred embodiment communication method for one or more of the nodes $N_x$ from FIG. 1.

FIG. 4 illustrates a flowchart of a preferred embodiment communication method 100 for one or more of the nodes $N_x$ from FIG. 1, which by way of example is illustrated in connection with G3-PLC. Method 100 commences with a step 110 where a node joins a session with another node. By way of example, therefore, node $N_1$ may join a session with node $N_2$, so that the two nodes may communicate data between them and also for potentially one of the two nodes routing data to another distant node. In general, therefore, node $N_1$ communicates at least one packet $PT_{PLC}$ to node $N_2$, so as to establish a communication session between the two, where a session is typically defined by an introductory packet sent by a first node to a second node, and some form of acknowledgment response by the second node back to the first node; indeed, further in this regard, PLC also supports a shorter ACK packet (or frame), which consists only of the preamble PR and the header HR and is sent by a receiving node so as to provide a verification to the sending node that the sending node's packet was successfully received.

After step 110, method 100 continues with a determine channel quality (CQ) step 120. Channel quality CQ is intended in this document to represent a measure of the ability for information to be accurately communicated between the two nodes of the session, where one typical measure would be signal-to-noise ratio (SNR). In this regard, step 120 may be realized by the first transmitting node $N_1$ sending a request to the second receiving node $N_2$ so that the latter can determine the channel quality CQ based on known measures from a received packet. In step 120, the second receiving node then reports this CQ measure back to the first transmitting node, where the report may be in a separate communicated packet $PT_{PLC}$.

After step 120, method 100 continues with a comparison step 130 in which a session node, such as the transmitting node (e.g., $N_1$), determines whether the channel quality CQ exceeds a threshold THR. If the channel quality CQ exceeds the threshold THR, then method 100 continues to step 140; otherwise, then method 100 continues to step 150. The value of the threshold THR may be established by one skilled in the art, given the type of measure used from the channel quality CQ, the type of communication, and other factors as ascertainable by the teachings of this document.

Note also that steps 120 and 130 may be achieved given an implicit recognition from the packet data payload modulation scheme. Specifically, in some existing packet protocols, a system may make an adjustment to the modulation scheme of a packet data payload, based on channel quality. For example, in various wireless and wireline technologies, for example, for a poorer channel quality, BPSK is used for the data payload, while for a next improved channel quality, QPSK is used for the data payload, and for a next improved channel quality, 8PSK is used for the data payload; in such implementations, however, only the data payload modulation scheme is adjusted, while the preamble and header are rigidly specified and maintained irrespective of channel quality. Given the preceding, in systems where the data payload modulation schemes is changed based on channel quality, then steps 120 and 130 may be realized by detecting the modulation scheme, or an indicator of the scheme, as a representation of the channel quality relative to a threshold, where, for example, step 130 may detect a BPSK data payload which thereby corresponds to the channel quality not exceeding a threshold, whereas step 130 may detect a QPSK (or 8PSK) data payload which thereby corresponds to the channel quality exceeding a threshold.

Figure 5:
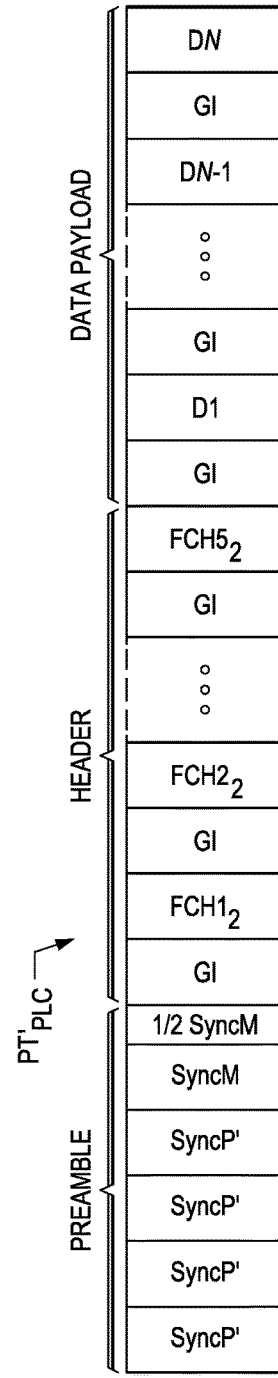
FIG. 5 illustrates an example of an alternative preferred embodiment and energy reducing communication packet $PT'_{PLC}$ for G3-PLC.

Step 140, having been reached because the channel quality CQ exceeds the threshold THR, thereby represents that the channel quality is better than might be expected under default (or even worst case scenario) conditions. As a result, step 140 operates to reduce one or both of the preamble PR length and the header HR coding; this action may be accomplished in various manners, such as setting an indicator (e.g., a flag) that is in, or readable by, the nodes of the session so that, to the extent they are capable of changing preamble and header lengths or formats, they will operate with the reduction of step 140. To this end, following step 140 is a step 160 in which any node in the session reached from step 140 will communicate per the threshold detection of step 130, and the reduction of step 140. Thus, whereas FIG. 3 represents a default packet $PT_{PLC}$ for PLC communications, FIG. 5 illustrates an alternative, lesser-energy consuming PLC packet indicated as $PT'_{PLC}$. Again, packet $PT'_{PLC}$ includes a packet preamble PR, a header HR, and a data payload DP, but in a preferred embodiment, alterations are implemented in one or both of the preamble PR and header HR so as to reduce the energy required of the session nodes in communicating the packet. In the example of FIG. 5, therefore, such energy reduction is achieved by reducing the eight identical SyncP symbols in the FIG. 3 packet preamble PR to four symbols, indicated as SyncP', which preferably are time-inverted SyncP symbols, meaning instead of frequency increasing chirp signals, each SyncP' is a frequency decreasing chirp signal and otherwise is a mirror-image of the rate of change in frequency relative to the SyncP symbols. By time-inverting in this manner, the syncP' symbols of FIG. 5 have a low cross correlation with the syncP symbol in FIG. 3.

Also in the example of FIG. 5, additional energy reduction is achieved in the header HR by reducing the FIG. 3 repetition by 6 (i.e., conventional super ROBO) coding in the header to repetition by 2. The benefits of such a reduction may again be illustrated using the above-introduced example of the information encoded in header CENELEC header for IEEE 1901.2, where recall that 39 bits of information are encoded into the header. For FIG. 5, these bits again pass through a ½ convolutional encoder, which thereby doubles the information to 78 bits. Here, however, repetition by 2 coding is then applied to each of these 78 bits, meaning, for each bit, its value of 1 or 0 is repeated 2 times, thereby creating a total of 156 (i.e., 78*2=156) bits. Again, these bits are interleaved and then communicated across a total of 36 frequencies or tones, but with only a total of 156 bits (as compared to the 468 giving rise to the FCH symbols in FIG. 3), then spreading those bits across the 36 tones can be accomplished in only 5 FCH symbols (i.e., CEIL156/36]=5, that is, rounding 156/36 up to the next integer), as shown in FIG. 5. Again on receipt of the header, therefore, the receiving node $N_x$ reverses the above, so as to eventually decode back to the original 39 bits, but here with much greater efficiency as only 5 FCH symbols are received and consume energy in the decoding process.

Having described step 140 which is reached because the channel quality CQ exceeds the threshold THR, step 150 represents the opposite conclusion of step 130, that is, where the channel quality CQ does not exceed the threshold THR. In step 150, therefore, the preferred embodiment maintains the communication system (e.g., PLC) default or standard-defined preamble PR length and header HR coding. Thus, communications proceed from the session nodes as again shown in step 160, but now according to the default of step 150. Thus, as illustrated, such communications would follow the packet $PT_{PLC}$ of FIG. 3, rather than the reduced energy packet $PT'_{PLC}$ of FIG. 5.

After step 160, method 100 continues with a comparison step 170, which is generally a wait state so that packet communications may continue per either step 140 or step 150, until the session is interrupted. Thus, if no session interruption occurs, then method 100 is shown to loop back to step 160 so that communications can continue based on an earlier selection of either step 140 or step 150 for the session. Eventually, the session may be interrupted, such as by a receiving node sending back control information indicating there was an error, multiple errors, or repeated errors in a received communication(s), where such control information may be way of a NACK communication or packet. Alternatively, the session may be interrupted by the transmitting node having a timeout period expire in which it expects to receive an ACK packet and none is received, as may occur from packet drops as between the nodes communicating in the session. In any event, if a session interruption occurs, then method 100 returns to step 110, in which case the above methodology again repeats.

Figure 6:
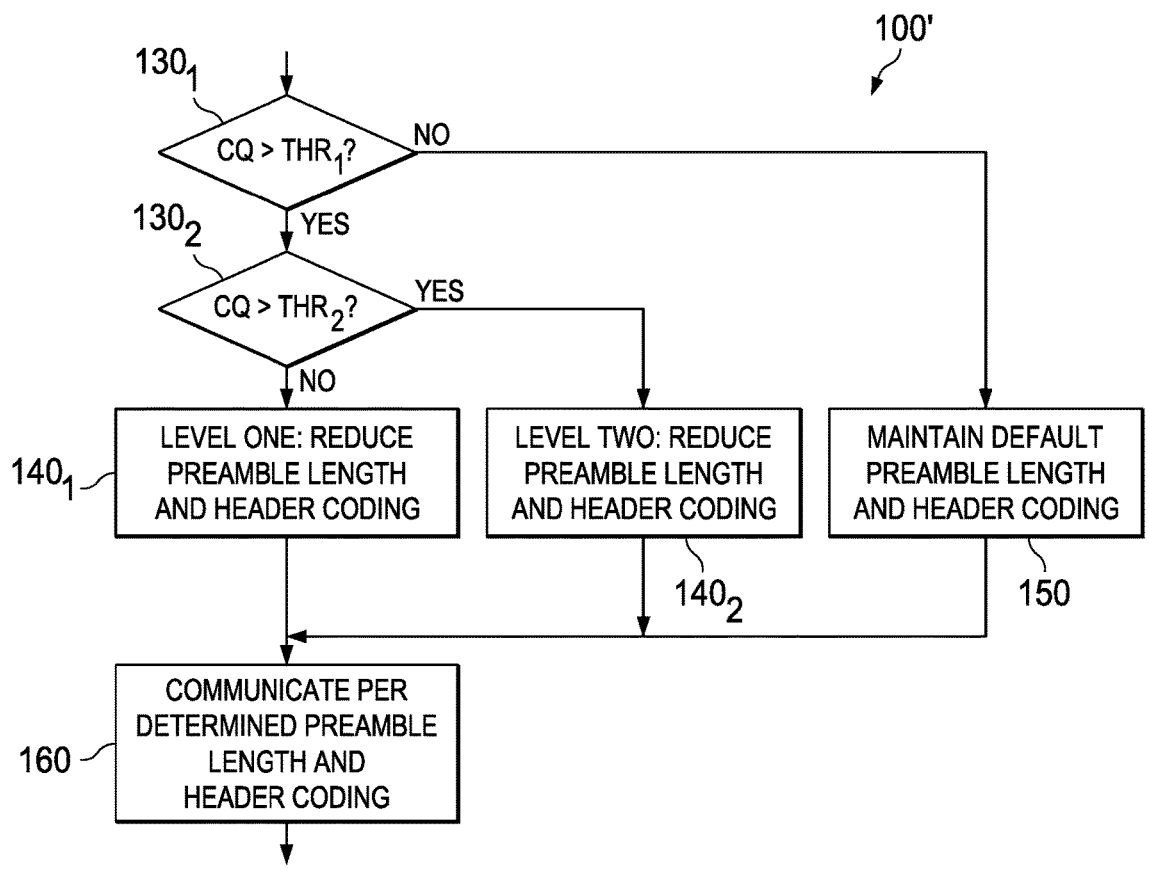
FIG. 6 illustrates a partial flowchart of another preferred embodiment communication method 100', as a modification of method 100 of FIG. 4.

FIG. 6 illustrates a partial flowchart of another preferred embodiment communication method 100', as a modification of method 100 of FIG. 4 and again, however, for one or more of the nodes $N_x$ from FIG. 1 and in the example of G3-PLC.

Specifically, FIG. 6 illustrates alternative steps $130_1$ and $130_2$ for step 130 in FIG. 4, whereby the channel quality CQ may be compared to multiple thresholds $THR_1$ and $THR_2$, respectively. In the same way as FIG. 4, if the channel quality CQ does not exceed any threshold, then again step 150 maintains a default preamble PR length and header HR coding. However, if the channel quality CQ exceeds a first threshold $THR_1$ as shown in step $130_1$, then the channel quality CQ is also compared to a second threshold $THR_2$ in step $130_2$, where such comparisons therefore will direct communications to either a LEVEL ONE (step $140_1$) reduction of preamble PR length and header HR coding for an intermediate level of channel quality, or to a LEVEL TWO (step $140_2$) reduction of preamble PR length and header HR coding for an even better level of channel quality. For example, whereas step 140 of FIG. 4 directed to a preamble PR with four SyncP' symbols and a header using repetition by 2, then in method 100' such parameters may apply to LEVEL ONE in step $140_1$, whereas LEVEL TWO in step $140_2$ may further reduce the energy for packet communication by having no repetition in the header HR (and potentially reducing the preamble PR, as well). In any event, therefore, a preferred embodiment may use three or more different levels of either preamble length or header coding, with reductions commensurate with the channel quality, thereby allowing reduced energy consumption when an improved channel quality is present.

Decoding by a receiving node in each preferred embodiment is consistent with the above teachings. Thus, when a receiving node detects a packet with a shortened preamble PR arising from an SNR that exceeds a threshold (i.e., shortened relative to the default preamble), then in one preferred embodiment, decoding of the header HR assumes the header HR is also shortened, consistent with the shortened preamble PR. In an alternative preferred embodiment, even if the receiving node detects a packet with a shortened preamble, the decoding recognizes the possibility that the header HR may not necessarily also be shortened. To address this contingency, the alternative preferred embodiment can decode the header HR both as a shortened header as well as the default-sized header. For example, in the instance illustrated by FIGS. 3 and 5, the header HR may include 13 FCH symbols encoded by repetition by 6 or 5 FCH symbols encoded by repetition by 2. In this case, therefore, if the preamble is short, the receiving node will receive and store bits sufficient to encompass 5 FCH repetition by 2 symbols, decode those bits under the assumption that this information is 5 such symbols, and then check the CRC; if the CRC passes, then the receiving node is thereby informed it has reached the end of the header HR by due to the pass. On the other hand, if the CRC check fails, then the receiving node accumulates additional bits which, with the already-received bits are sufficient to encompass 13 FCH repetition by 6 symbols, and the entirety of these bits are then decoded under the assumption that this information is 13 such symbols.

While the preceding examples have been in the context of wireless (e.g., PLC) communications, alternative preferred embodiments also contemplate FIGS. 4 and 6 applied to wireless communications. For example, IEEE 802.15 specifies wireless personal area network (WPAN) standards and IEEE 802.15.4 specifies the physical layer and media access control for low-rate wireless personal area networks (LR-WPANs). In this regard, in connection with the optional O-QPSK modulation, the standard calls for data at four different rates with four different spreading factors, also known as Direct Sequence Spreading (DSSS). However, the PHY structure for the packet requires that all four rates use the same preamble and start frame delimiter (SFD) that together are considered a synchronization header (SHR), consisting of a 32-bit preamble and a 16-bit SFD, for a total of 48 bits, and these 48 bits are spread by a factor of 32 for a total of 1,536 chips. Applying the preferred embodiment to this standard, however, provides an energy-reduced, length shortened, SHR, when channel quality is relatively high, as will be the case when the data payload has a higher data rate, such as RM2 and RM3, while a higher energy consuming, longer SHR is used for lesser channel quality, as will be the case when the data payload has a lower data rate, such as RM0 and RM1. As an example, the shortened SHR may consist of only 24-bits of preamble and SFD, instead of the standard 48-bits of SHR. Moreover, the partitioning of bits between the preamble and SFD may be altered. In one example, the reduced 24 bits of SHR are partitioned between 8-bit preamble and an alternate 16-bit SFD that has good cross-correlation properties with the original 16-bit SFD, or an alternate example of the reduced 24-bit SHR are partitioned between 12 bits of preamble and a 12-bit SFD that also has good cross-correlation properties with the original 16-bit SFD.

Also recognized in the preferred embodiment is that in a network of nodes, from a tree structure standpoint and message hopping from a root node down to the leaf node(s), different nodes may be wireline or wireless. Further, along certain paths, all the intermediate nodes may be hybrid nodes, that is, they support both wireless and wireline. In this regard, therefore, a preferred embodiment methodology provides that each intermediate node chooses a packet preamble or header that minimizes energy consumption (i.e., either transmit, receive, or a combination of both), given the discerned channel quality, as well as the transmit power and physical layer technology available to the node. Thus, the choice is made not just within the rate modes of OFDM and within the rate modes of O-QPSK separately, but instead between all the available rate modes, such as between FSK, OFDM, and O-QPSK as a single set. Or, the set may be reduced with choices still available from within it, so for example the set may include the higher rate modes of O-QPSK, with the alternative preambles described earlier. Thus, in some embodiments, the choice is between a given wireless standard or a wireline standard from the perspective of minimizing total energy consumption. In instances where there are multiple hops between the leaf node and the root node, and all the intermediate nodes are hybrid nodes, the intermediate communication link may be chosen based on the PHY technology that minimizes the energy consumption for successful communication of the given packet size.

From the above, various embodiments provide numerous improvements to packet communication by providing a methodology that optimizes packet preamble and/or header so as to reduce energy in communication of the packet during a session. Such improvements are evident from the above, and also have been observed by the present inventors considering that, in a point to point communication link between two nodes, the transmission time for a packet transfer is given by the time taken for a packet transmission, which necessarily includes the preamble and header overheads, and the time for an acknowledgement which also (e.g., for PLC) may include the preamble and header. Thus, the communication energy for such packets is directly affected by the energy expended in transmitting, receiving, and decoding the information in the packet that precedes the data payload, and for short data payloads, therefore, a relatively larger amount of energy is consumed with respect to non-data payload information. Such energy consumption is considerably undesirable for certain types of nodes, particularly those operating on battery power. Thus, the preferred embodiments improve on such considerations, with therefore various benefits over the prior art. Various aspects have been described, and still others will be ascertainable by one skilled in the art from the present teachings. Given the preceding, therefore, one skilled in the art should further appreciate that while some embodiments have been described in detail, various substitutions, modifications or alterations can be made to the descriptions set forth above without departing from the inventive scope, as is defined by the following claims.

The invention claimed is:

1. A method of communicating a packet between a first node and a second node, the packet comprising a data payload, a preamble, and a header, with the preamble and header preceding the data payload, the method comprising:
   first, identifying a quality of a channel between the first node and the second node;
   second, in response to the quality of the channel, selecting a packet format from one of a default packet format in which the preamble has a first length and the header has a second length and a reduced-energy packet format in which the preamble has a third length and the header has a fourth length, wherein the third length has less bits than the first length and the fourth length has less bits than the second length;
   third, encoding information into the preamble and header of the packet in accordance with the selected packet format; and
   fourth, transmitting the packet from the first node to the second node.

2. The method of claim 1 wherein the fourth step comprises transmitting the packet from the first node to the second node along a wireline medium.

3. The method of claim 1 wherein at least one of the first node and the second node comprises a sensor and the data payload is representative of information detected by the sensor.

4. The method of claim 1 wherein the second step comprises selecting between a first number of repeating chirp symbols for the first length and a second number, different from the first number, of repeating chirp symbols for the third length.

5. The method of claim 4 wherein each symbol in the second number of repeating chirp symbols is a time-inversion of each symbol in the first number of repeating chirp symbols.

6. The method of claim 1 wherein at least one of the first node and the second node is a battery powered node.

7. The method of claim 1 wherein the second step comprises selecting between a first level of bit repetition for the second length and a second level of bit repetition, the first level differing from the second level for the fourth length.

8. The method of claim 1 wherein the fourth step comprises transmitting the packet from the first node to the second node along a wireless medium.

9. The method of claim 1 wherein the second step comprises selecting a PHY modulation among a plurality of PHY modulations.

10. The method of claim 1 wherein the first step comprises determining a signal to noise ratio of the channel.

11. The method of claim 1 wherein the first step comprises determining a modulation type of the data payload.

12. The method of claim 1 wherein the second step comprises comparing the quality of the channel to at least one threshold.

13. The method of claim 1 wherein the second step comprises comparing the quality of the channel to a plurality of thresholds.

14. The method of claim 1 wherein the second step comprises selecting a rate mode among a plurality of rate modes.

* * * * *